United States Patent [19]

Powlesland et al.

[11] 4,027,002

[45] May 31, 1977

[54] HYDROGEN SULPHIDE REMOVAL PROCESS

[75] Inventors: William H. Powlesland; James W. Smith, both of Toronto, Canada

[73] Assignee: Powlesland Engineering Limited, Rexdale, Canada

[22] Filed: Aug. 29, 1975

[21] Appl. No.: 608,843

[52] U.S. Cl. .................. 423/573 G; 423/574 R; 51/313; 252/411 S; 23/288 B
[51] Int. Cl.² .................................. C01B 17/04
[58] Field of Search .......... 423/571, 573, 574, 576, 423/577, 231; 209/2, 235; 51/313, 314, 315, 316; 252/411; 55/2, 300; 23/288 B

[56] References Cited

UNITED STATES PATENTS

| 1,412,219 | 4/1922 | Richardson | 252/411 |
| 1,922,872 | 8/1933 | Thompson | 423/573 |
| 1,936,154 | 11/1933 | Carter | 252/411 |
| 2,551,905 | 5/1951 | Robinson | 423/573 X |
| 2,983,573 | 5/1961 | Moore et al. | 423/231 |
| 3,110,300 | 11/1963 | Brown et al. | 55/300 X |

*Primary Examiner*—G. O. Peters
*Attorney, Agent, or Firm*—Sim & McBurney

[57] ABSTRACT

This invention provides a process for continuously removing $H_2S$ from a fouled gas containing some oxygen. The process involves the passing of the fouled gas through a mass of porous hematite pellets in a chamber, thereby producing water and forming elemental sulphur on the pellets, and abrading the pellets to remove the elemental sulphur in a comminuted form. This invention also provides an apparatus adapted to carry out this process.

2 Claims, 2 Drawing Figures

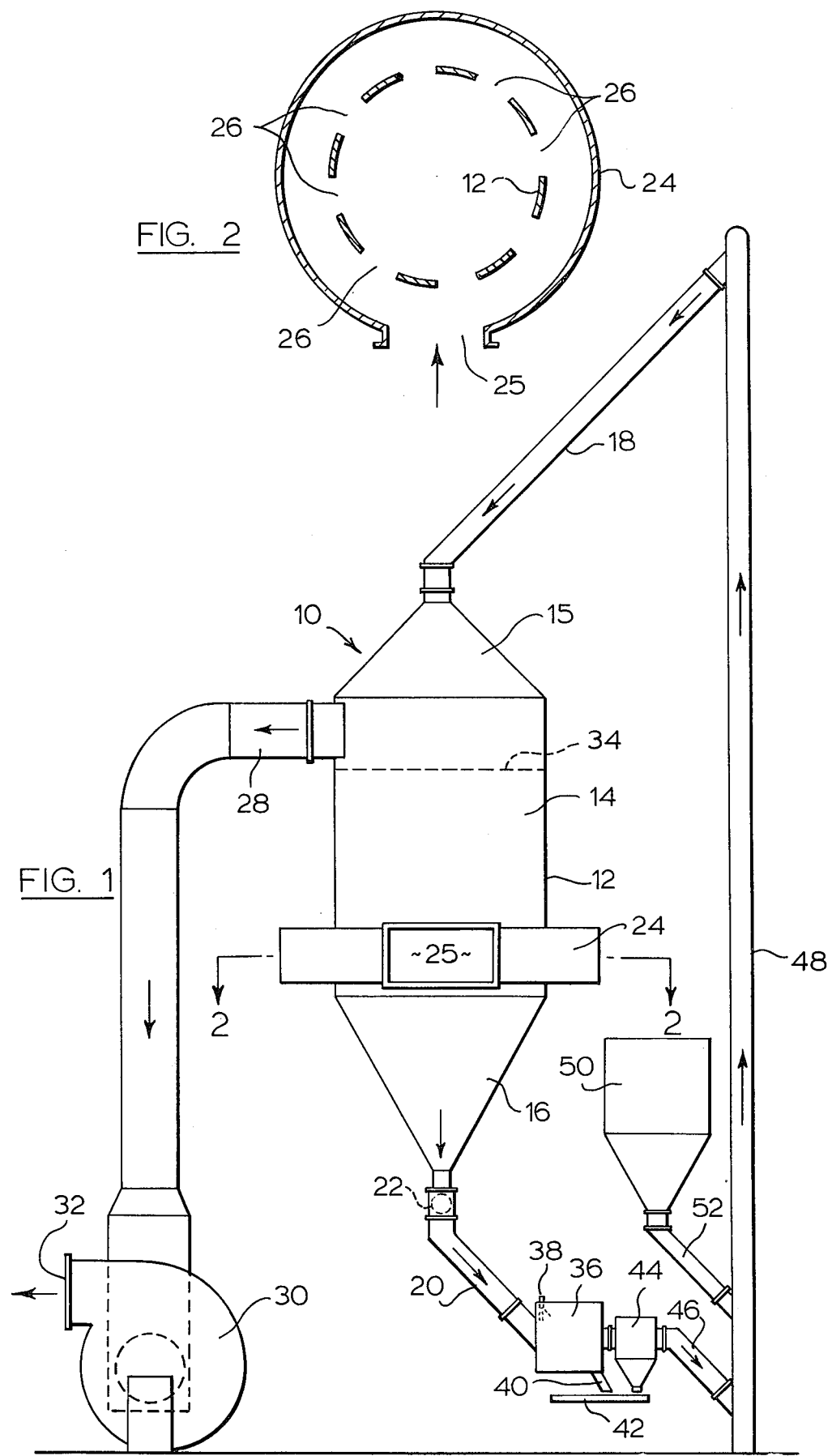

HYDROGEN SULPHIDE REMOVAL PROCESS

This invention relates to a process and an apparatus for removing sulphurous gases from gas streams. More particularly, this invention relates to the removal of hydrogen sulphide from gas streams on a continuous or intermittent basis, with continuous or intermittent replenishment of the materials utilized in the process.

It is known that H$_2$S can be removed from gas streams in the presence of a small amount of oxygen or SO$_2$ by contacting the gas with particles of hydrated iron oxide.

In one conventional process, the H$_2$S-containing gas is passed through a series of boxes filled with highly reactive hydrated iron oxide and wood shavings. After a time, the hydrated iron oxide becomes coated with sulphur and partially converted to iron sulphide. The boxes are then removed from the gas stream and exposed to the open air, where the iron sulphide is re-oxidized with the evolution of free sulphur (S), and the revivified boxes are placed back in the gas stream. After a time, when the total sulphur content increases to 50%–60%, the reactant has to be discarded or the sulphur must be extracted by means of a solvent.

Both of the chemical steps of the above process are exothermic, and the fact that the process utilizes wood shavings places certain temperature limitations on the reaction conditions. Further, it is a disadvantage to be confronted with the necessity, from time to time, of discarding the whole mass of iron oxide and wood shavings due to the presence of a high sulphur content, and the alternative necessity of extracting the sulphur by means of a solvent is also time-consuming and expensive.

The prior art also contemplates the use of hematite in the non-hydrated form, however the same problems and disadvantages crop up with this form of iron oxide as with the hydrated form. The reactions are essentially the same, and are again exothermic. The problem of what to do when the sulphur content becomes unmanageably high must again be confronted.

In the context of a continuous process utilizing hematite to remove H$_2$S from fouled gases, it is an aspect of this invention to provide a workable and low-cost solution to the problem relating to the gradual and increasing accumulation of sulphur in the iron oxide material.

Accordingly, this invention provides a process for the removal of H$_2$S from a fouled gas containing O$_2$ or SO$_2$ or both, comprising the steps: passing the fouled gas through a mass of hematite pellets in a chamber, thereby producing water and forming an elemental sulphur coating on the pellets, and abrading the pellets to remove the elemental sulphur in a comminuted form.

This invention further provides apparatus for the removal of H$_2$S from a fouled gas containing some O$_2$ or SO$_2$ or both, comprising: means defining a reaction chamber having therein a mass of hematite pellets, means for passing said fouled gas through the reaction chamber thereby producing water and forming an elemental sulphur coating on the pellets, and means for abrading the pellets to remove the elemental sulphur in a comminuted form.

One embodiment of this invention is shown in the accompanying drawings, in which like numerals denote like parts throughout the several views, and in which:

FIG. 1 is a schematic elevational view of an apparatus adapted to carry out the process of this invention; and FIG. 2 is a horizontal sectional view taken at the line 2—2 in FIG. 1.

When a gas containing essentially no oxygen is passed through a bed of Fe$_2$O$_3$, the reaction appears to be:

$$3 H_2S + Fe_2O_3 = Fe_2S_3 + 3 H_2O + 14,800 \text{ cal.} \qquad 1$$

This reaction goes on within a very wide temperature range: between 68° F and at least 1500° F. It is believed that, at lower temperatures, hydrated Fe$_2$O$_3$ reacts faster than anhydrous Fe$_2$O$_3$, and this tends to explain the preference in the prior art for the use of hydrated iron oxide. After a lapse of time, the bed of Fe$_2$O$_3$ will be substantially converted to Fe$_2$S$_3$, so that the gas cannot any longer contact the remaining Fe$_2$O$_3$. At this point, the bed must be replaced and the iron oxide regenerated. This may be done by one of two different oxidizing processes as follows:

Low Temperature Oxidation

When a gas containing oxygen is passed through a bed of iron oxide which has been sulphided in accordance with formula (1) above, at temperatures below the boiling point of sulphur, the reaction appears to be:

$$Fe_2S_3 + 1½O_2 = Fe_2O_3 + 3S + 144,000 \text{ cal.} \qquad 2$$

Here, elemental sulphur is formed. Elemental sulphur melts at 240° F and can be expected to become sticky, plugging up the pores in the particles making up the bed, and also causing the whole mass of particles to stick together.

The heat release from this reaction is large, and very roughly, at 50% excess air it would produce a rise of about 2000° F. This takes the reaction well above the boiling point of sulphur (832° F) where the elemental sulphur could ignite. Ignition could produce a further heat release as shown below in formula (3) with the end product being SO$_2$ instead of S. Temperatures of the reaction (2) above would have to be kept down to prevent reaction (3) from occurring.

High Temperature Oxidation $$Fe_2S_3 + 4½O_2 = Fe_2O_3 + 3SO_2 + 347,000 \text{ cal.} \qquad 3$$

At 50% excess air, the reaction (3) produces a rise in excess of 3,000° F. Since it is undesirable to produce sulphur dioxide in the context of industrial processes of the kind here contemplated, reaction (3) above is best avoided if possible.

Catalytic Internal Oxidation

When a gas containing a small percentage of oxygen is passed through a bed of Fe$_2$O$_3$, it can be assumed that both reactions (1) and (2) proceed simultaneously, such that it is possible to combine the two reactions, leaving out the intermediate products and assuming that the iron oxide acts in a a catalytic sense, as follows:

$$2H_2S + O_2 = 2H_2O + 2S + 106,520 \text{ cal.} \qquad 4$$

Iron Oxide

Catalyst

SO$_2$ Oxidation

When a fouled gas containing some SO$_2$ is passed through a bed of Fe$_2$O$_3$, the reaction appears to be $$2H_2S + SO_2 = 2H_2O + 3S + 46,230 \text{ cal.}$$

Where both $O_2$ and $SO_2$ are present in the fouled gas, the $H_2S$ appears to react preferentially with the $SO_2$ rather than with the $O_2$.

An apparatus for continuously carrying out the catalytic internal oxidation expressed above in reaction (4) (the combined reactions (1) and (2)) is shown in the figures, to which attention is now directed.

In FIG. 1 an apparatus shown generally at 10 is seen to consist of a vessel 12 having a generally cylindrical portion 14, an upwardly converging conical portion 15 above the cylindrical portion 14, and a downwardly converging conical portion 16 below the cylindrical portion 14. The portions 14, 15 and 16 define a continuous open reaction chamber into which reaction material is passed through a conduit 18, and from which reaction material is withdrawn along a conduit 20.

A positive feed mechanism 22, such as a star feeder, is provided to adjust and control the rate at which reaction material is permitted to pass out of the chamber defined by the portions 14, 15 and 16, and into the conduit 20.

Encircling the lower region of the cylindrical portion 14 of the vessel 12 is a bustle or plenum 24, having an inlet opening 25. As seen in FIG. 2, there are provided a plurality of circumferentially spaced ports 26 in the wall of the cylindrical portion 14 of the vessel 12, fully within the plenum 24.

A gas outlet duct 28 opens through the wall of the cylindrical portion 14 of the vessel 12, at the upper region thereof, and leads to the inlet or suction opening of a centrifugal fan 30. Treated and exhausted gas then passes out of the outlet opening 32 of the fan 30, which may be conducted along further conduits, ducts or the like.

Before proceeding further to describe the regenerative and replenishment means associated with and forming part of the apparatus 10, it is desirable to discuss in detail the particular preferred reaction material contemplated by this invention. The reaction material contemplated by this invention consists of a mass of hematite pellets, preferably porous, and having hematite in the anhydrous form of $Fe_2O_3$.

Porous hematite pellets are produced by the beneficiation of iron minerals such as hematite, magnetite and iron sulphides after grinding to fine particle size to free the iron from the accompanying gangue minerals. The concentrate iron product is then converted into pellets by rolling a thick paste containing about 10% water in pelletizing drums and finally baking the resultant green pellets in a kiln, shaft furnace or sintering machine to produce uniform spheres of hematite. The spheres which result are porous, about ⅜ inch to ⅝ inch diameter, and very hard so that they will not break down under handling. The pellet product is essentially free from fines.

When pellets as described above are passed continuously through the vessel 12 shown in FIG. 1 such that the pellet bed height within the vessel 12 is approximately at the broken line 34, the countercurrent passage of fouled gas containing some oxygen from the plurality of circumferentially spaced ports 26 upwardly through the reaction chamber within the vessel 12 and out along the outlet duct 28 results in the accretion on and in the pellets of a fine surface layer containing sulphur in the pure elemental form. It is thus considered that reaction (4) above is taking place within the bed of porous hematite pellets inside the vessel 12, with the hematite acting as a catalyst for the conversion of hydrogen sulphide and oxygen to water and elemental sulphur.

As previously stated, this invention provides means for abrading the hematite pellets after removal from the reaction chamber, in order to remove the elemental sulphur from the hematite pellets in a comminuted form.

Attention is now directed again to the figures. As seen in FIG. 1, the conduit 20 empties into a ball mill 36 which is adapted to rotate about its axis, usually a horizontal axis, thereby tumbling the sulphur-coated hematite pellets against one another, thus abrading away the elemental sulphur. The sulphur is removed in the form of a fine dust, along with a small amount of iron oxide from the underlying pellets, and an amount of iron sulphide which is taken to be an intermediate product in the catalytic reaction set out under (4) above.

The ball mill 36 in FIG. 1 is provided with a high pressure air inlet means 38, and an outlet chute 40. The admission of high pressure air to the interior of the ball mill 36 will tend to carry sulphur and any other fines abraded from the hematite pellets downwardly along the chute 40, where they may in turn be carried away to a suitable disposal along an endless belt conveyor 42, or other suitable conveyor.

After a period of tumbling against each other in the ball mill 36, the abraded and thus regenerated hematite pellets pass into a vibrating separator screen 44, which in the contemplated apparatus is provided as a cylindrical screen oriented with its axis horizontal, and adapted to be rotated about its axis. The pellets from the ball mill 36 simply pass progressively through the cylindrical vibrating screen and out the other side along a further conduit 46. The passage of the pellets through the vibrating separator screen 44 is intended to accomplish some additional tumbling and abrasion, the removal of any remaining sulphur and other fines, and the separation out of any hematite pellets which have, by repeated passages through the vessel 12, been reduced in size below a particular dimension related to the mesh size of the vibrating separator screen 44. As seen in the figure, all such separated-out materials may also be conveyed away along the conveyor 42.

As seen, the conduit 46 empties into the lower end of a bucket elevator 48 which is vertically oriented, and which is adapted to raise the hematite pellets from the lower end to the upper end, where they enter the earlier described conduit 18 which conducts them to the top end of the vessel 12 for a further passage through the vessel 12.

A pellet container 50 is provided with a conduit 52 also emptying into the bucket elevator 48, so that any diminution in the total mass of hematite pellets in the apparatus may be replenished back to a desired optimum level, at which the upper surface of the pellet bed in the vessel 12 (the broken line 34) is maintained at a desired location.

It is considered that the ball mill 36 may be used with the apparatus shown in the figures without requiring the presence of the vibrating separator screen 44, since the ball mill 36 accomplishes both the abrasion and the removal of the abraded sulphur by itself. It is further considered possible to dispense with the ball mill 36 and utilize only the vibrating separator screen 44, since the latter also accomplishes abrasion and the removal of sulphur which has been abraded from the hematite pellets. Thus, this invention contemplates the use of either the ball mill or the vibrating separator screen or both together.

It will be understood that the hematite pellets may be either continuously or intermittently added to and withdrawn from the reactor. While the apparatus disclosed is capable of continuous operation, in most practical applications the pellets would probably only be added and withdrawn once a day for part of a shift. Thus, the pellet regeneration process could be considered to work continuously while being operated, but probably would only operate for a part of the time. The gas flow through the reactor, however, could quite easily be on a continuous basis regardless of whether the pellet regeneration system were running or not.

It will also be understood that, while FIG. 2 shows simple spaced ports 26 opening from the plenum 24 into the interior of the vessel 12, such ports could be replaced by tuyere pipes or any equivalent structure which would accomplish the purpose of passing the gas from the plenum into the interior of the reaction vessel.

While the process disclosed herein utilizes porous hematite pellets as the preferred reaction material, it is expected that lump hematite or, screened to about ⅜ inch to ⅝ inch size would also work satisfactorily.

The particular embodiment described in connection with the drawings mentions the use of high pressure air entering the ball mill 36 at inlet means 38. It is contemplated that a water or other suitable liquid spray used in place of the high pressure air would also prove satisfactory in carrying sulphur and other fines out of the ball mill and downwardly along the shute 40.

While a ball mill and a vibrating separator screen have been specifically disclosed in connection with the preferred embodiment of the apparatus of this invention, it is contemplated that these may be replaced, respectively, by a log washer and an air classifier.

It has been observed that certain types of particulates in the form of sub-micron dust in the gas to be treated are also removed by the pellet bed described above. In particular, the dust observed to be trapped by the bed was calcium and magnesium silicate glass with very high concentrations below one micron, in the shape of spherical blobs. It is believed that the reasons for the entrapment of this dust are related to electrostatic effects, and it is expected that a similar effect would be noticed for most non-conductive particulates.

What we claim is:

1. A process for the removal of $H_2S$ from a fouled gas containing $O_2$ or $SO_2$ or both, comprising the steps:

passing the fouled gas continuously upwardly through a mass of porous hematite pellets in a chamber while the pellets are passed downwardly therethrough, thereby producing water and forming an elemental sulphur coating on the pellets, continuously withdrawing the sulphur-coated pellets from the bottom of the chamber, continuously tumbling the pellets against one another to abrade the elemental sulphur from their surfaces, and continuously returning the abraded pellets to the top of the chamber, the elemental sulphur coating being formed in accordance with either the equations (a) and (b), or the equation (c), or the equation (d) as follows:

a $3H_2S + Fe_2O_3 = Fe_2S_3 + 3H_2O + 14,800$ cal.
b $Fe_2S_3 + 1½O_2 + Fe_2O_3 + 3S + 144,000$ cal.
c $2H_2S + O_2 = 2H_2O + 2S + 106,520$ cal. (Iron Oxide Catalyst)
d $2H_2S + SO_2 = 2H_2O + 3S + 46,230$ cal.

the pellets additionally being passed over a vibrating separator screen to separate abraded and comminuted elemental sulphur and to separate pellets which have been abraded below a predetermined dimension as established by the screen mesh size.

2. The process claimed in claim 1, in which the fouled gas passes continuously upwardly through a chamber while the pellets pass continuously downwardly therein, the step of abrading including the continuous withdrawal of sulphur-coated pellets from the bottom of the chamber, the continuous passing of the pellets over a vibrating separator screen to abrade the sulphur and to separate both the abraded sulphur and pellets smaller than a given dimension, and the continuous return of abraded pellets to the top of the chamber.

* * * * *